(12) United States Patent
Wingett et al.

(10) Patent No.: US 9,103,422 B2
(45) Date of Patent: Aug. 11, 2015

(54) BALL SCREW ACTUATOR INCLUDING A COMPLIANT BALL SCREW STOP

(71) Applicant: HONEYWELL INTERNATIONAL INC., Morristown, NJ (US)

(72) Inventors: Paul T. Wingett, Mesa, AZ (US); Casey Hanlon, Queen Creek, AZ (US)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 36 days.

(21) Appl. No.: 13/911,568

(22) Filed: Jun. 6, 2013

(65) Prior Publication Data

US 2014/0305238 A1 Oct. 16, 2014

Related U.S. Application Data

(60) Provisional application No. 61/810,988, filed on Apr. 11, 2013.

(51) Int. Cl.
| | |
|---|---|
| *F16H 3/06* | (2006.01) |
| *F16H 27/02* | (2006.01) |
| *F16H 29/02* | (2006.01) |
| *F16H 29/20* | (2006.01) |
| *F16H 25/20* | (2006.01) |
| *F16H 25/22* | (2006.01) |

(52) U.S. Cl.
CPC ........ *F16H 25/2015* (2013.01); *F16H 25/2204* (2013.01); *Y10T 74/18688* (2015.01)

(58) Field of Classification Search
USPC ......... 74/89.23, 89.37, 89.39, 424.71, 424.82
See application file for complete search history.

(56) References Cited

U.S. PATENT DOCUMENTS

| | | | |
|---|---|---|---|
| 2,715,341 A * | 8/1955 | Hogan | ........................ 74/89.37 |
| 3,732,744 A | 5/1973 | Rowland | |
| 3,762,227 A | 10/1973 | Bohnhoff | |
| 3,766,798 A | 10/1973 | Kusiak | |
| 4,266,437 A | 5/1981 | Obergfell | |
| 4,479,397 A | 10/1984 | Jelinek et al. | |
| 4,712,440 A | 12/1987 | Rousselot | |
| 5,456,330 A | 10/1995 | Kojima et al. | |
| 5,868,032 A | 2/1999 | Laskey | |
| 6,761,080 B2 | 7/2004 | Lange et al. | |
| 7,728,477 B2 | 6/2010 | Birdi et al. | |
| 7,896,147 B2 | 3/2011 | Burke et al. | |
| 8,109,165 B2 | 2/2012 | Himmelmann | |
| 8,360,397 B2 | 1/2013 | Watanabe | |
| 8,424,402 B2 | 4/2013 | Watanabe et al. | |
| 2002/0149268 A1 | 10/2002 | Yamada et al. | |
| 2003/0037629 A1 | 2/2003 | Nagai et al. | |
| 2010/0319472 A1 | 12/2010 | Wei et al. | |
| 2011/0072921 A1 * | 3/2011 | Himmelmann | ............... 74/89.37 |
| 2011/0303032 A1 * | 12/2011 | Oberle et al. | ................ 74/89.39 |
| 2012/0090418 A1 | 4/2012 | Barthlein et al. | |

* cited by examiner

*Primary Examiner* — David M Fenstermacher
*Assistant Examiner* — Jake Cook
(74) *Attorney, Agent, or Firm* — Ingrassia Fisher & Lorenz, P.C.

(57) ABSTRACT

An actuator includes a ball nut, a ball screw, and a ball screw stop. The ball nut is adapted to receive an input torque and in response rotates and supplies a drive force. The ball screw extends through the ball nut and has a first end and a second end. The ball screw receives the drive force from the ball nut and in response selectively translates between a retract position and a extend position. The ball screw stop is mounted on the ball screw proximate the first end to translate therewith. The ball screw stop engages the ball nut when the ball screw is in the extend position, translates, with compliance, a predetermined distance toward the first end upon engaging the ball nut, and prevents further rotation of the ball screw upon translating the predetermined distance.

4 Claims, 13 Drawing Sheets

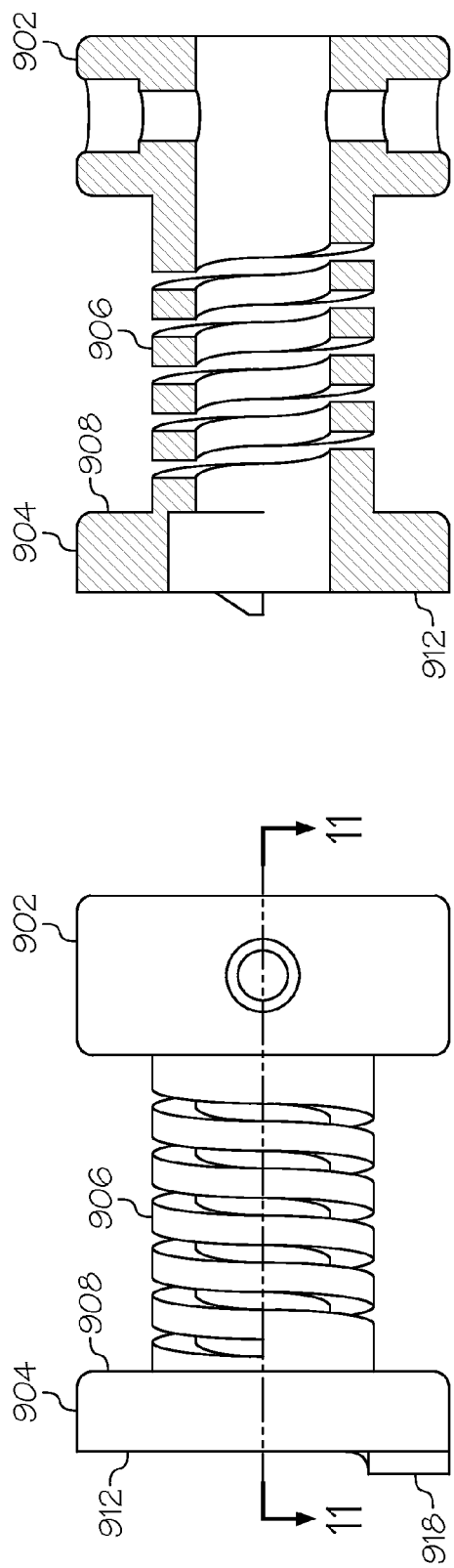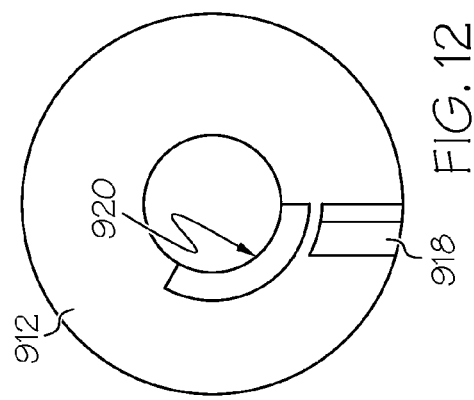

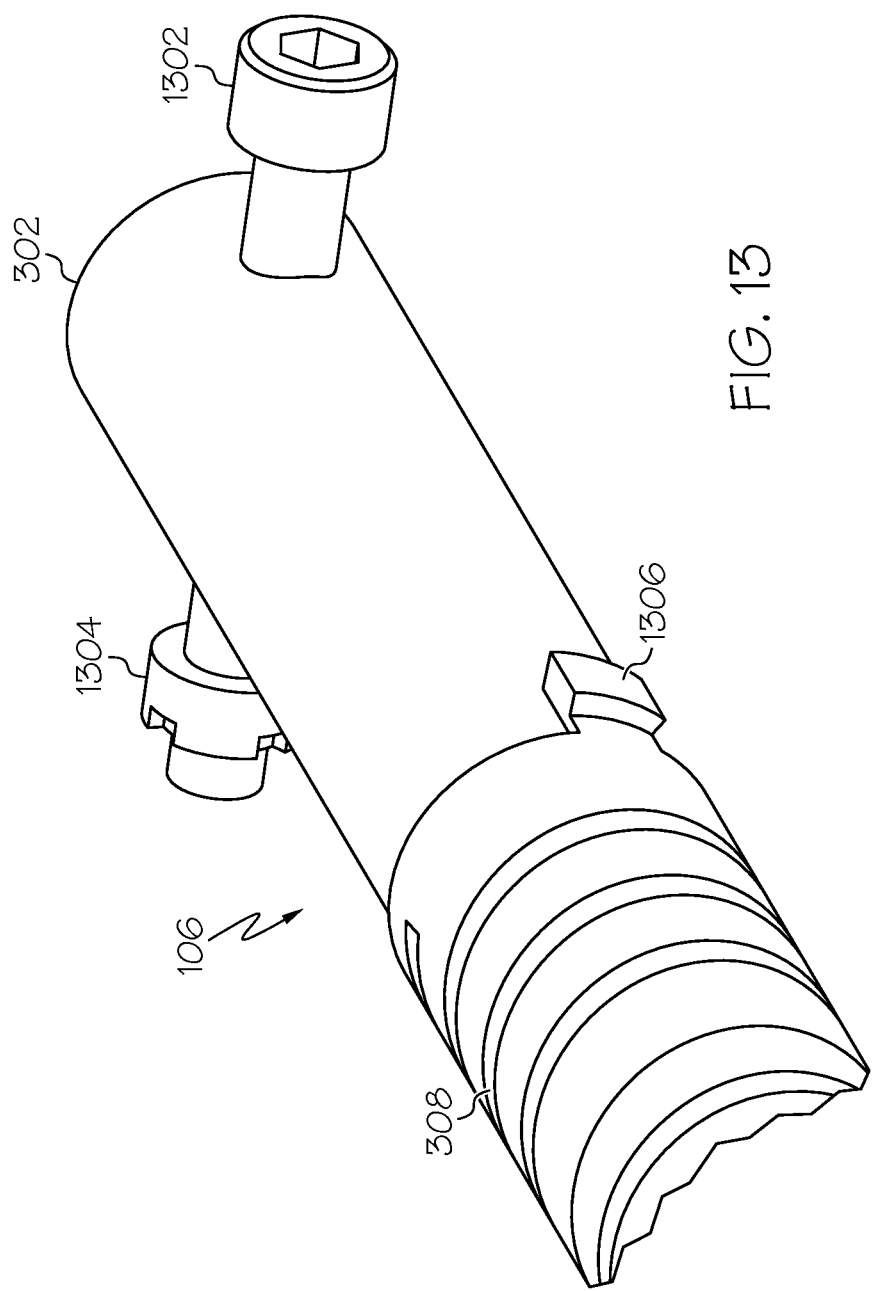

BALL SCREW ACTUATOR INCLUDING A COMPLIANT BALL SCREW STOP

CROSS-REFERENCE TO RELATED APPLICATION

This application claims the benefit of U.S. Provisional Application No. 61/810,988, filed Apr. 11, 2013.

STATEMENT REGARDING FEDERALLY SPONSORED RESEARCH OR DEVELOPMENT

This invention was made with Government support under Agreement No. NAS15-10000 awarded by NASA. The Government may have certain rights in this invention.

TECHNICAL FIELD

The present invention generally relates to actuators, and more particularly relates to linear, ball screw actuators that include a compliant ball screw stop.

BACKGROUND

Actuators are used in myriad devices and systems. For example, many vehicles including, for example, aircraft, spacecraft, watercraft, and numerous other terrestrial and non-terrestrial vehicles, include one or more actuators to effect the movement of various control surfaces or components. Many different types of actuator configurations presently exist. One particular type of actuator is a linear electromechanical actuator (EMA). A typical linear EMA includes a power drive unit, an actuation member, and a translation member. The power drive unit, such as a motor, is configured to supply a drive torque to the actuation member, which in turn causes the translation member to translate.

One particular type of linear EMA is a ball screw actuator. This type of actuator includes a ball screw and a ball nut. The ball nut is mounted on, and is configured to rotate relative to, the ball screw. In some configurations, the ball screw is the actuation member, and the ball nut is the translation member. With these configurations, the power drive unit drives the ball screw, which causes the ball nut to translate. In other configurations, the ball nut is the actuation member, and the ball screw is the translation member. With these configurations, the power drive unit drives the ball nut, which causes the ball screw to translate. With either of these configurations, when the power drive unit is an electric motor, a relationship of motor current and force can be desirable for calibration purposes. Unfortunately, presently known actuators do not readily allow this relationship to be determined when a positive position device is not present.

Hence, there is a need for an actuator that readily allows the relationship of motor current and force to be readily determined when a positive position device is not present. The present invention addresses at least this need.

BRIEF SUMMARY

In one embodiment, an actuator includes a ball nut, a ball screw, and a ball screw stop. The ball nut is adapted to receive an input torque and is configured, upon receipt thereof, to rotate and supply a drive force. The ball screw extends through the ball nut and has a first end and a second end. The ball screw is coupled to receive the drive force from the ball nut and is configured, upon receipt of the drive force, to selectively translate between a retract position and a extend position. The ball screw stop is mounted on the ball screw proximate the first end to translate therewith. The ball screw stop is configured to engage the ball nut when the ball screw is in the extend position, to translate, with compliance, a predetermined distance toward the first end upon engaging the ball nut, and to prevent further rotation of the ball screw upon translating the predetermined distance.

In another embodiment, an actuator includes a ball nut, a motor, a ball screw, and a ball screw stop. The ball nut is adapted to receive an input torque and is configured, upon receipt thereof, to rotate and supply a drive force. The ball nut has a first dog stop formed on an end thereof. The motor is coupled to the ball nut and is configured to selectively supply the drive torque thereto. The ball screw extends through the ball nut and has a first end and a second end. The ball screw is coupled to receive the drive force from the ball nut and is configured, upon receipt of the drive force, to selectively translate between a retract position and a extend position. The ball screw stop is mounted on the ball screw proximate the first end to translate therewith. The ball screw stop has a second dog stop formed on an end thereof and is configured to engage the ball nut when the ball screw is in the extend position, to translate, with compliance, a predetermined distance toward the first end upon engaging the ball nut, and to prevent further rotation of the ball screw upon translating the predetermined distance. The first dog stop and the second dog stop mate when the ball screw stop engages the ball nut.

In yet another embodiment, a method of establishing a relationship between motor current and reaction force for an electromechanical actuator (EMA) that is driven by a motor includes providing a stop mechanism in the EMA that exhibits a predetermined force versus displacement characteristic. Current is supplied to the motor so that the stop mechanism is engaged and is displaced a predetermined distance thereby supplying a reaction force. Motor current is measured while the stop mechanism is engaged, and the relationship between motor current and reaction force is determined.

Furthermore, other desirable features and characteristics of the actuator and method will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the drawing figures, wherein like numerals denote like elements, and wherein:

FIGS. 10-12 depicts side, cross section, and end views, respectively, of the ball screw stop;

FIG. 13 depicts a close-up view of the end of the ball screw on which the ball screw stop is mounted;

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
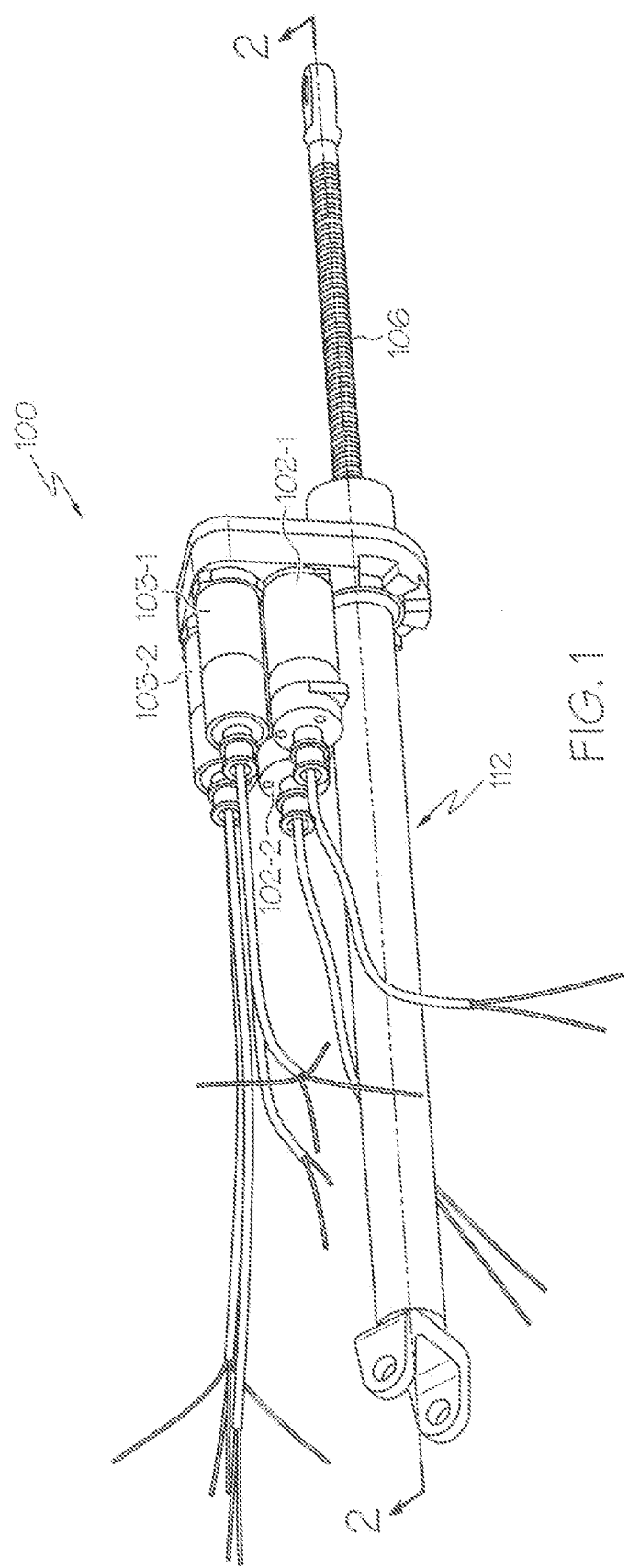
FIG. 1 depicts a plan view of one embodiment of a ball screw actuator assembly.
Figure 2:
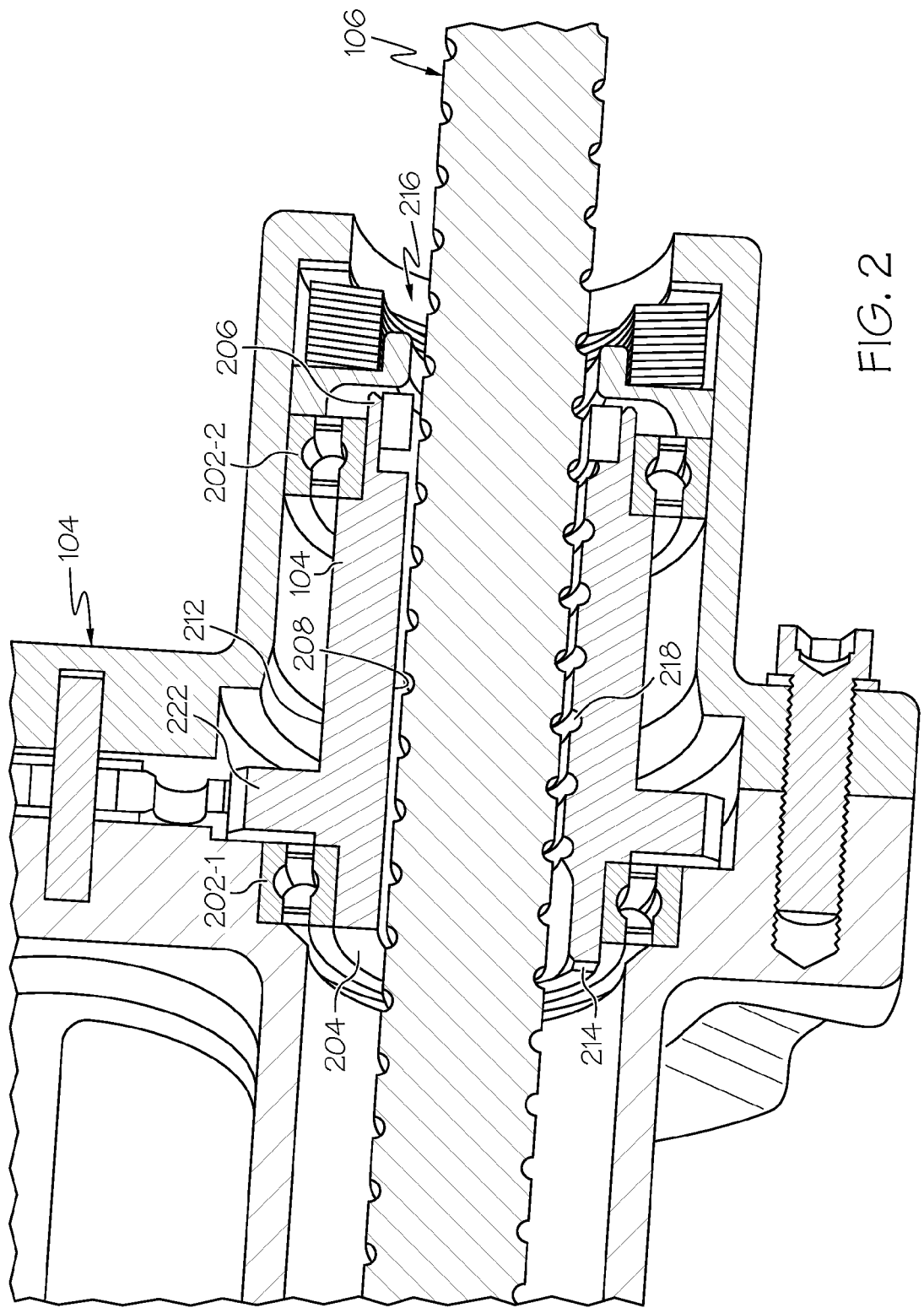
FIG. 2 depicts a close-up cross section view of a ball nut and a portion of a ball screw that may be used to implement the actuator assembly of FIG. 1.

Referring to FIGS. 1 and 2, an exemplary ball screw actuator 100 is depicted. The depicted actuator 100 is a linear electromechanical (EMA) actuator and includes a pair of motors 102 (102-1, 102-2), a ball nut 104, and a ball screw 106, all disposed at least partially within or on an actuator housing assembly 112. The motors 102, which are mounted on the housing assembly 112, may be variously configured and implemented. For example, each motor 102 may be implemented using any one of numerous types of hydraulic motors, pneumatic motors, or electric motors. In the depicted embodiment, each is implemented using an electric motor, which may be any one of numerous types of electric motors, such as an AC motor, a brushed DC motor, or a brushless DC motor, just to name a few. No matter how the motors 102 are specifically implemented, each is coupled to the ball nut 104, preferably via a non-illustrated gear set, and each is configured to selectively supply a drive torque to the ball nut 104. Although two redundant motors 102 are depicted in FIG. 1, it will be appreciated that the actuator 100 could be implemented with more or less than this number of motors.

Before proceeding further, it is noted that the depicted actuator 100 additionally includes a pair of position sensors 103 (103-1, 103-2). The position sensors 103, like the motors 102, are mounted on the housing assembly 112 and may be variously configured and implemented. In the depicted embodiment, however, the position sensors 103 are each implemented using a resolver configured to provide an output signal representative of actuator position.

The ball nut 104, which is shown more clearly in FIG. 2, is rotationally mounted in the housing assembly 112, via a plurality of bearing assemblies 202 (202-1, 202-2). The ball nut 104 is coupled to receive the input torque supplied from one or both of the motors 102 and is configured, upon receipt thereof, to rotate and supply a drive force to the ball screw 106. The ball nut 104 may be variously configured and implemented, but includes at least a first end 204, a second end 206, an inner surface 208, and an outer surface 212. The ball nut first end 204 has a first dog stop 214 formed thereon, the purpose of which will be described further below. The ball nut inner surface 208 defines a passageway 216 that extends through the ball nut 104 between the first and second ends 204, 206, and has a plurality of helical ball grooves (or "threads") 218 formed thereon. The ball nut outer surface 212 has an input gear 222 coupled thereto and extending therefrom. The input gear 222 receives, via the non-illustrated gear set, the rotational drive torque supplied from one or both of the motors 102, which in turn causes the ball nut 104 to rotate and supply the drive force to the ball screw 106.

Figure 3:
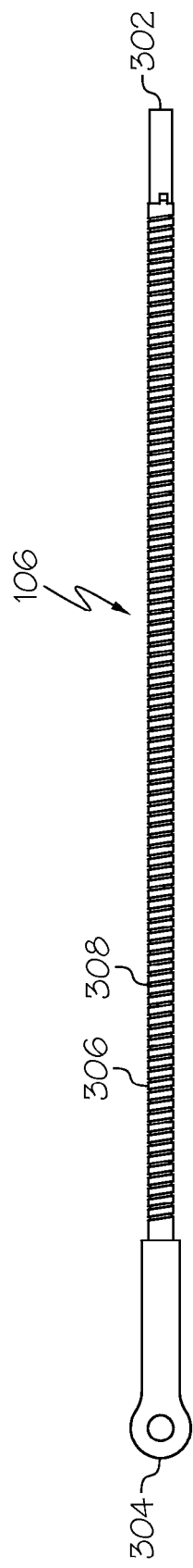
FIGS. 3 and 4 depict two different side views of a ball screw that may be used to implement the actuator of FIG. 1.
Figure 4:
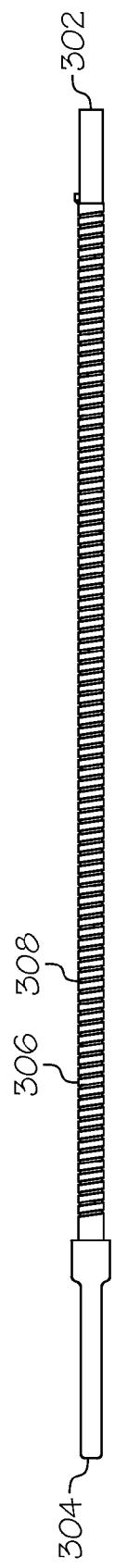
Figure 5:
FIG. 5 depicts a cross section view taken along line 5-5 in FIG. 3.

The ball screw 106 is mounted within the housing assembly 112 and extends through the ball nut passageway 216. The ball screw 106 is configured, upon receipt of the drive force supplied thereto from the ball nut 104, to selectively translate between a retract position and a extend position. As illustrated most clearly in FIGS. 3-5, the ball screw 106 includes a first end 302, a second end 304, and an outer surface 306. The ball screw outer surface 306 has a single or a plurality of ball grooves (or "threads") 308 formed thereon. A plurality of non-illustrated recirculating balls are disposed within the ball nut ball grooves 218, and in selected ones of the ball screw ball grooves 308. The balls, in combination with the ball grooves 218, 308, convert the rotational movement of the ball nut 104 into the translational movement of the ball screw 106. It will be appreciated that the direction in which the ball screw 106 travels will depend on the direction in which the ball nut 104 rotates.

Figure 6:
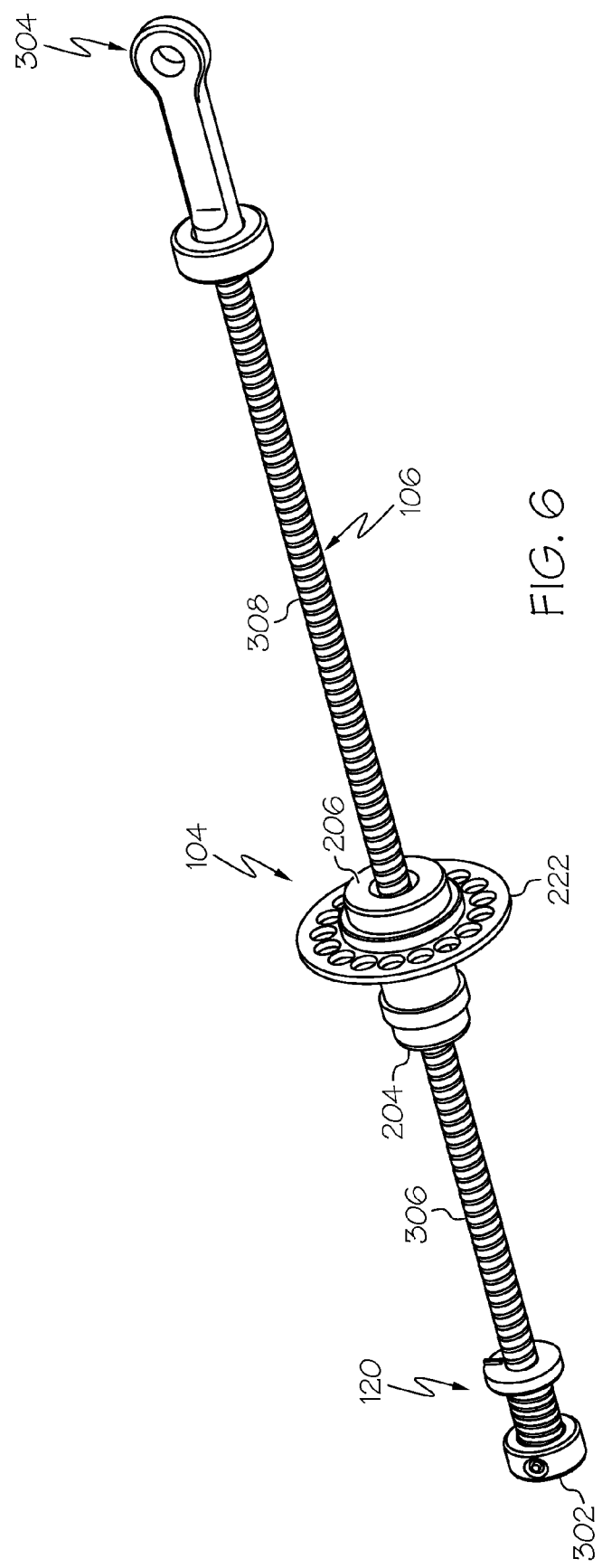
FIGS. 6 and 7 depict plan views of the ball screw of FIGS. 3 and 4 with a ball nut and ball screw stop mounted thereon.
Figure 7:
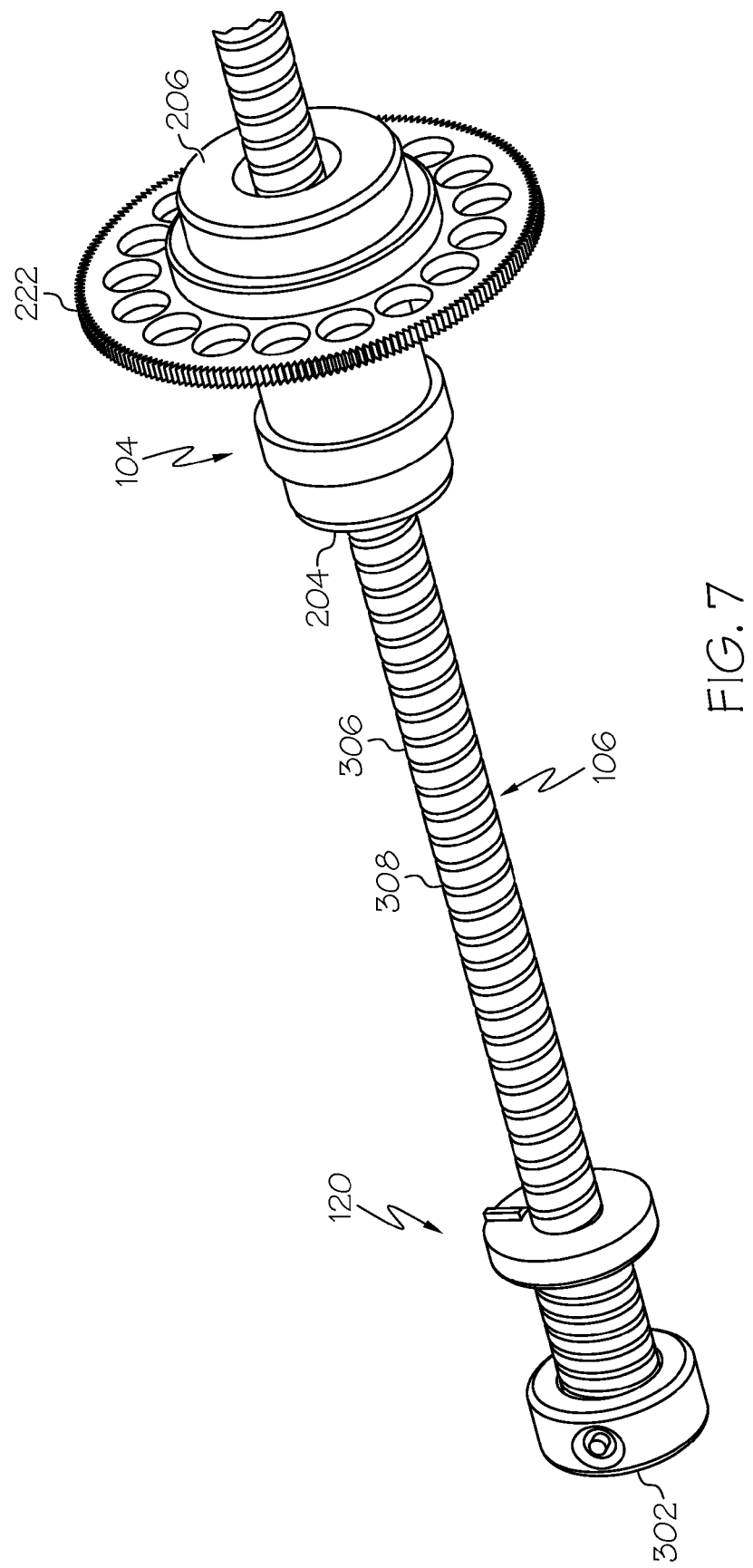
Figure 8:
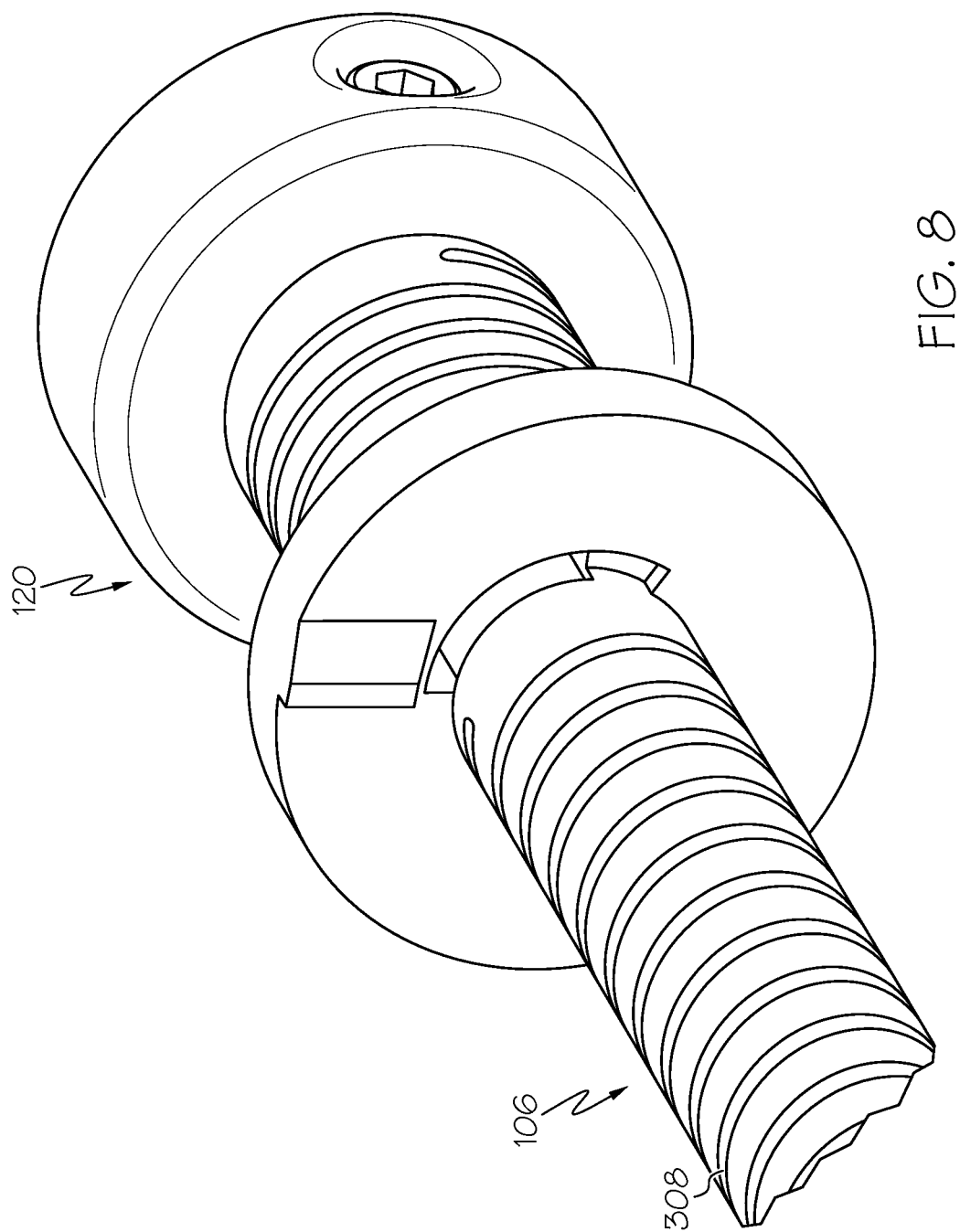
FIG. 8 is a close-up plan view of the ball screw stop mounted on the ball screw.
Figure 9:
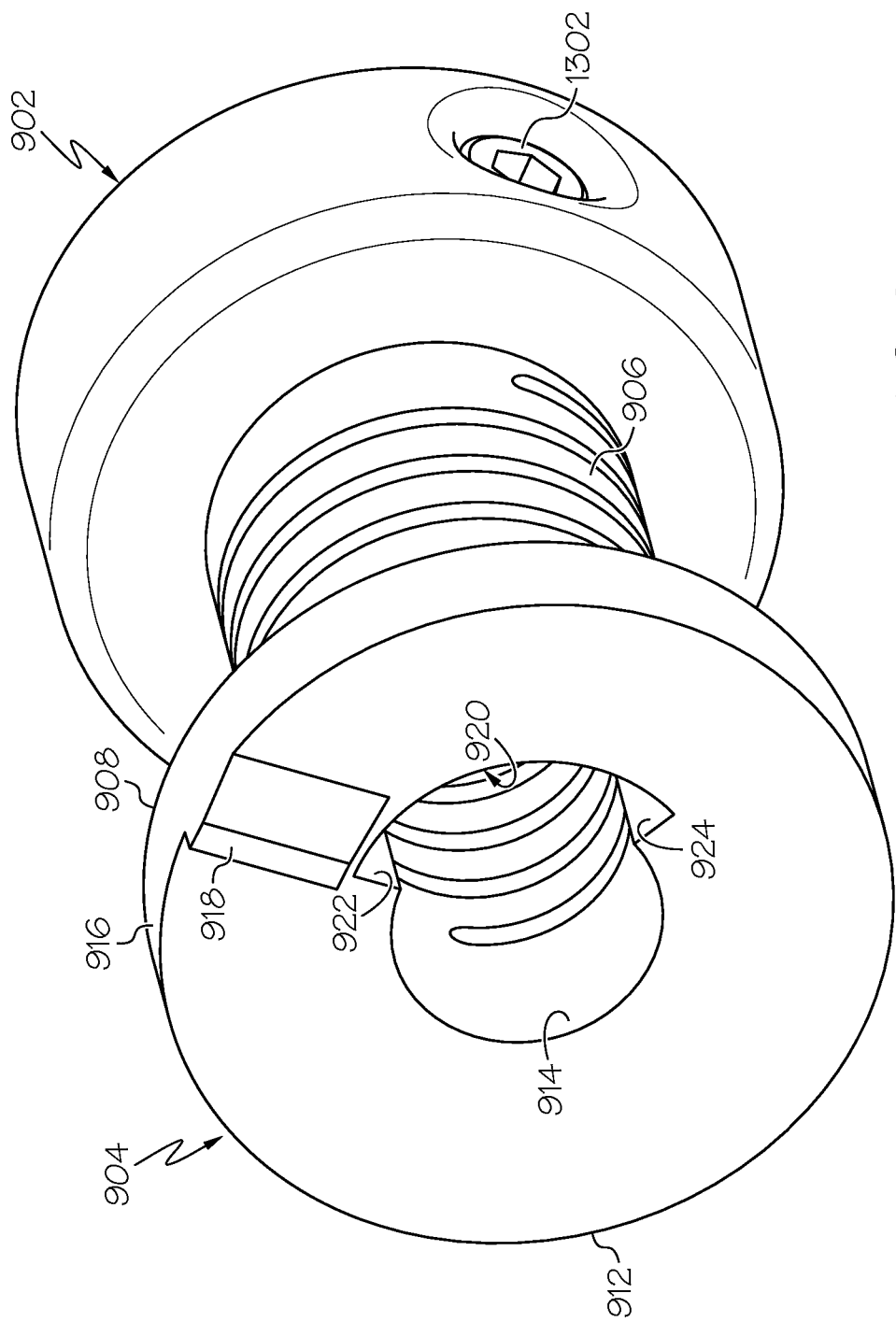
FIG. 9 depicts a plan view of an embodiment of the ball screw stop.
Figure 14:
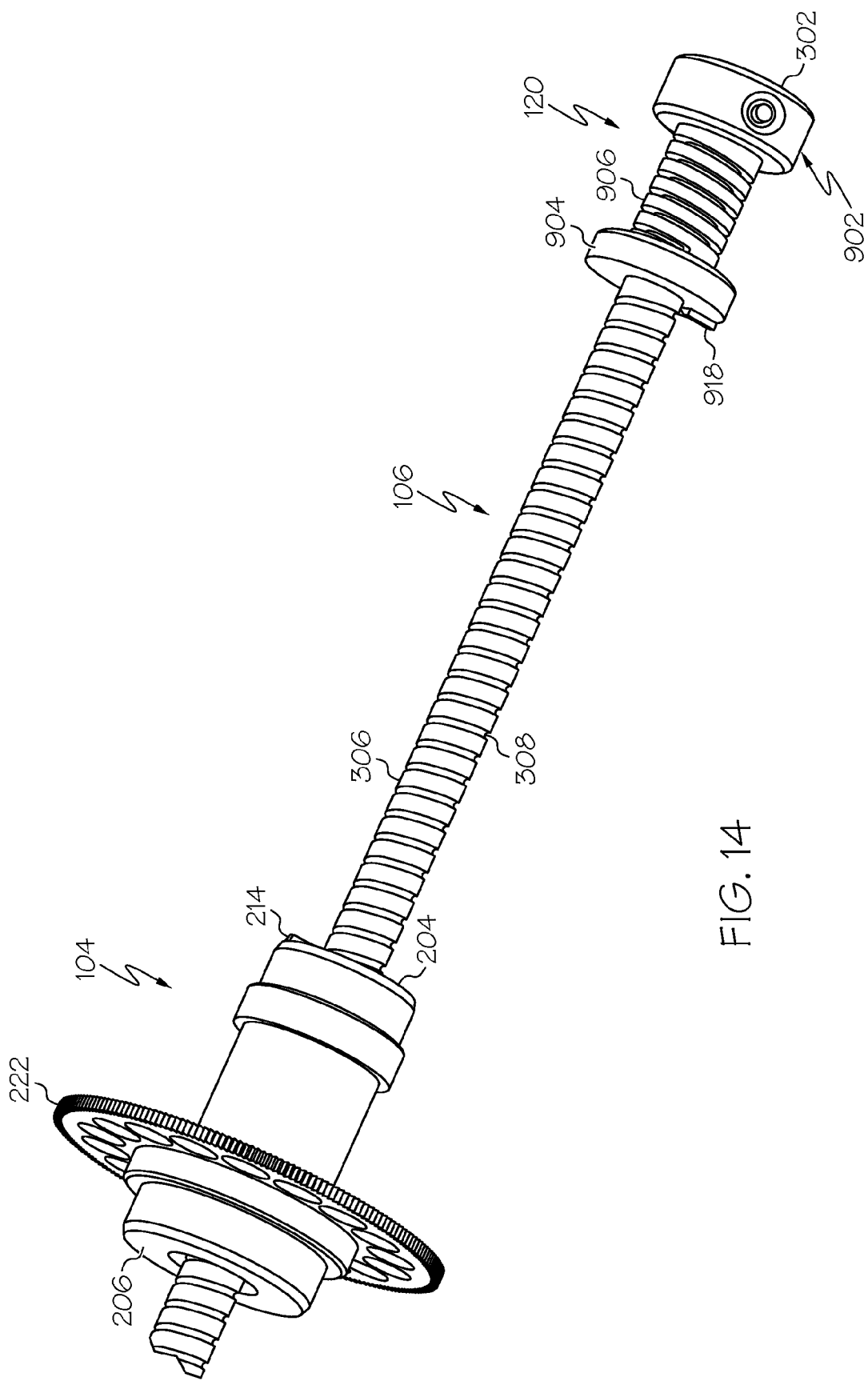
FIGS. 14-16 depict various views of the ball screw, ball nut, and ball screw stop.
Figure 15:
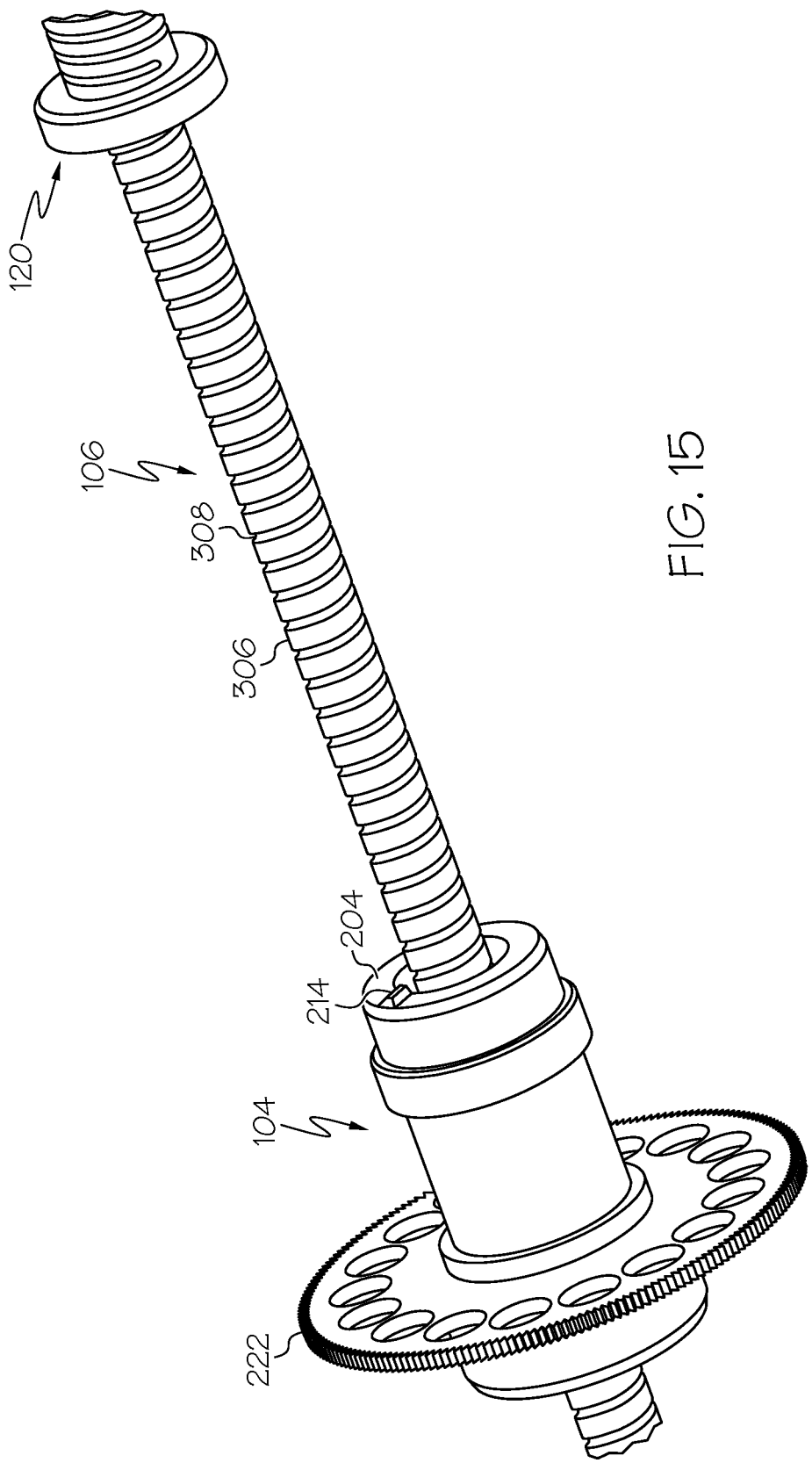
Figure 16:
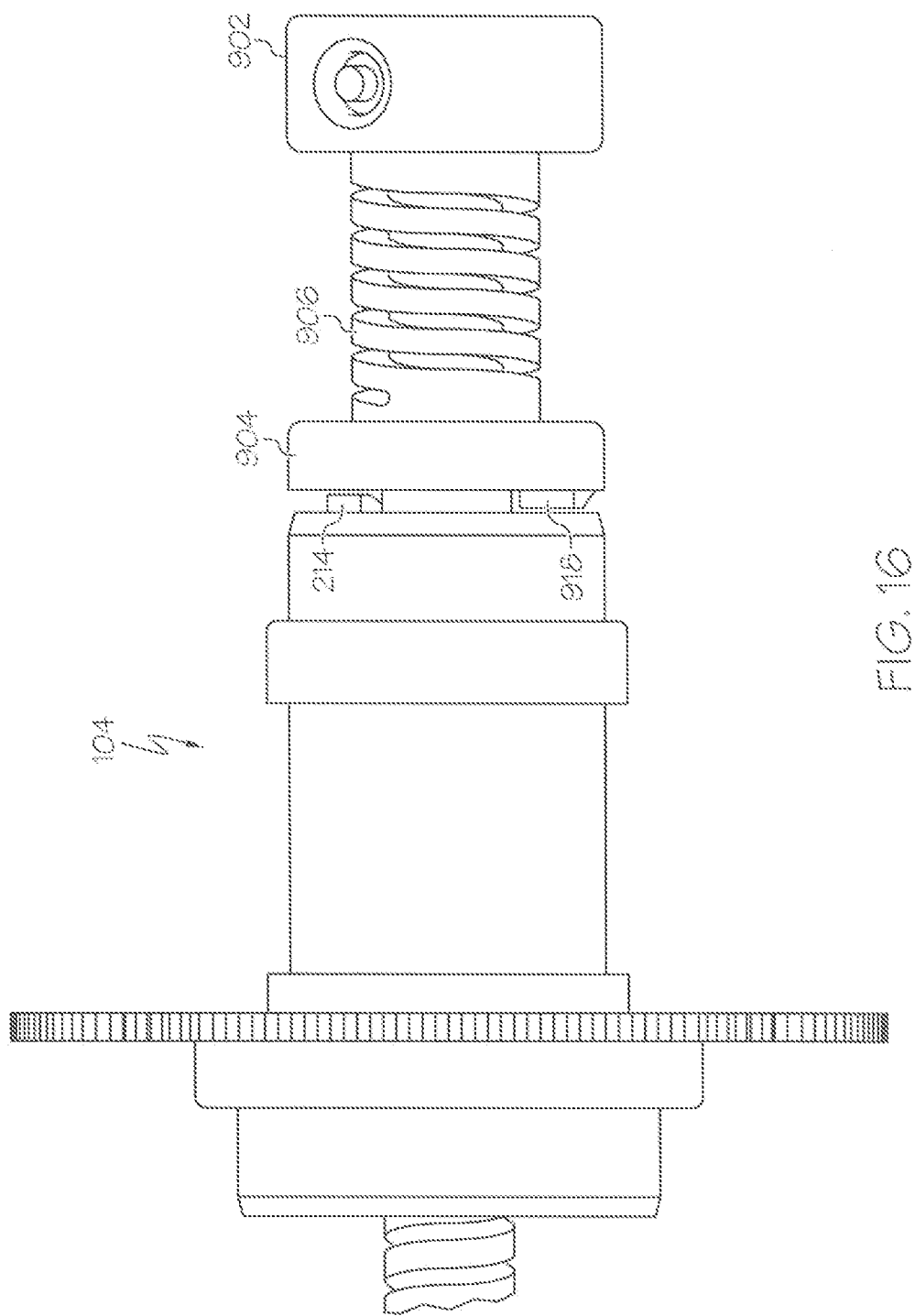

As FIGS. 6-8 further depict, a ball screw stop 120 is mounted on the ball screw 106 in a manner that causes the ball screw stop 120 to translate with ball screw 106. The ball screw stop 120 may be variously implemented, but is configured to engage the ball nut 104 when the ball screw 106 is in the extend position. The ball screw stop 120 is additionally configured such that, upon engaging the ball nut 104, a portion thereof translates, with compliance, a predetermined distance toward the first end 302 of the ball screw 106 and, upon translating the predetermined distance, to prevent further rotation of the ball nut 104 in one direction, while allowing rotation thereof in an opposite direction. It will be appreciated that the ball screw stop 120 may be variously configured to implement this functionality. One particular embodiment of the ball screw stop 120 is depicted more clearly in FIGS. 9-12, and with reference thereto will now be described.

The depicted ball screw stop 120 includes a guide member 902, a stop member 904, and a spring member 906. The guide member 902 is mounted directly on, and surrounds, the first end 302 of the ball screw 106. As shown even more clearly in FIGS. 8 and 13, the guide member 902 is mounted on the ball screw 106 via a fastener 1302 that extends through the guide member 902 and the ball screw 106, and is held in place via a nut 1304.

The stop member 904 is coupled to the guide member 902 via the spring member 906, and also surrounds the ball screw 106. The stop member 902 includes a first end 908 (see FIG. 9), a second end 912, an inner surface 914, and an outer surface 916. The first end 908 is coupled to the spring member 906, and the second end 912 has a second dog stop 918 formed thereon. The second dog stop 918 is configured to mate with the first dog stop 214 that is formed on the ball nut 104 when the ball screw stop 120 engages the ball nut 104. The inner surface 914 defines an opening through which the ball screw 106 extends. The inner surface 914 also has a rotation limit feature 920 formed therein. In particular, a portion of the inner surface 914 has an increased diameter relative to the remainder thereof, and thereby forms two engagement surfaces—a first engagement surface 922 and a second engagement surface 924. The purpose of the engagement surfaces 922, 924 will be described momentarily.

The spring member 906 is coupled between the guide member 902 and the stop member 904, and is what causes the ball screw stop 120, and more specifically the stop member 904, to translate with compliance. In the depicted embodiment, the spring member 906 is implemented as a torsion spring. It will be appreciated, however, that it may be implemented as a helical spring, a beam spring, or any one of numerous other devices.

The first and second dog stops 214, 918, as noted above, will mate and engage each other when the ball screw 106 is moved to the fully extended position. Because of the spring member 906, when the first and second dog stops 214, 918 engage, the ball nut 104 will begin rotating the stop member 904 and to also drive it axially toward the first end of the ball screw 106. However, the rotational and axial movements of the stop member 904 are limited. This is because when the stop member 904 has moved the predetermined distance toward the first end 302 of the ball screw 106, the first engagement surface 922 will engage a stop feature 1306 (see FIG. 13) formed on the outer surface 306 of the ball screw 106 proximate its first end 302. When the first engagement surface 922 engages the stop feature 1306, the stop member 904 will prevent further rotation of the ball nut 104 in the direction that causes the ball screw 106 to translate toward the extend position. It is noted herein that the depicted spring member 906 has a helix formed therein that is opposite to the helix that defines the ball screw threads 308. For example, in the depicted embodiment the ball screw threads 308 are defined by a right-hand helix, and the helix formed in the spring member 906 is a left-hand helix. As a result, when the first engagement surface 922 engages the stop feature 1306, the diameter of the spring member 906 will increase.

Figure 17:
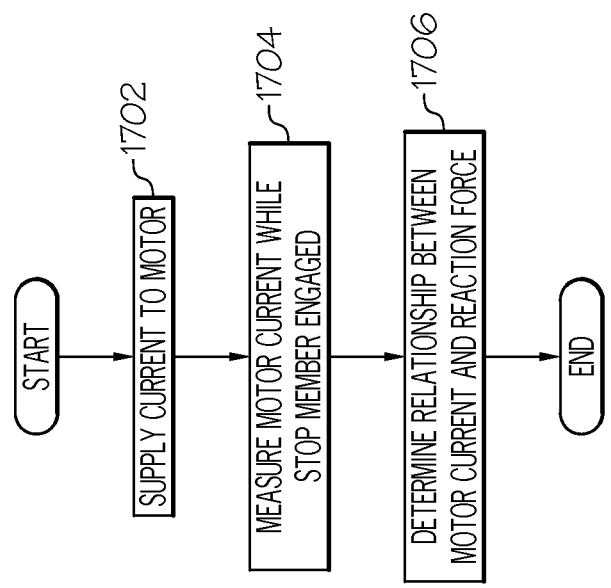
FIG. 17 depicts a process, in flowchart form, for determining a relationship between motor current and a known reaction force supplied from a spring member.

The ball screw stop 120 described herein allows one or both of the motors 102 to drive the ball nut 104 into the ball screw stop 120 so that a relationship between the motor current and the known reaction force supplied from the spring member 906 can be determined. In particular, and as depicted in flowchart form in FIG. 17, current is supplied to the motor 102 so that the stop member 904 is engaged and displaced the predetermined distance (1702). As a result, the spring member 906 will supply a reaction force. By measuring the motor current while the stop member 904 is engaged (1704), the relationship between motor current and reaction force can be determined (1706). This indicates to the non-illustrated actuator controller that the ball screw 106 is in the extend position, and sets the resolver(s) 103 to that point. Thus, the controller now knows actuator position. With the motor current relationship having been determined, the controller, on a subsequent power up, can establish the full extend position by driving the actuator to the extend position until a predetermined current level is achieved. The controller may then count resolver rotations to determine absolute position.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An actuator, comprising:
   a ball nut adapted to receive an input torque and configured, upon receipt thereof, to rotate and supply a drive force, the ball nut comprising a first dog stop;
   a ball screw extending through the ball nut and having a first end and a second end, the ball screw coupled to receive the drive force from the ball nut and configured, upon receipt of the drive force, to selectively translate between a retract position and a extend position;
   a stop feature formed on the ball screw; and
   a ball screw stop mounted on the ball screw to translate therewith, the ball screw stop comprising:
      a guide member mounted directly on and surrounding the first end of the ball screw;
      a stop member surrounding the ball screw and spaced apart from the guide member, the stop member including a first end, a second end, an inner surface, and an outer surface, the first end coupled to the guide member, the second end having a second dog stop formed thereon that is configured to mate with the first dog stop, the inner surface defining an opening through which the ball screw extends, a portion of the inner surface having an increased diameter to thereby form a first engagement surface and a second engagement surface, one of the first or second engagement surfaces configured to be selectively engaged by the stop feature, and
      a spring member coupled to and disposed between the guide member and the stop member,
   wherein the ball screw stop is configured to:
      (i) engage the ball nut when the ball screw is in the extend position,
      (ii) translate, with compliance, a predetermined distance toward the first end upon engaging the ball nut, and
      (iii) prevent further rotation of the ball screw upon translating the predetermined distance.

2. The actuator of claim 1, wherein the ball screw stop, upon translating the predetermined distance, prevents rotation of the ball nut in one direction while allowing the rotation of the ball nut in an opposite direction.

3. The actuator of claim 1, further comprising:
   a motor coupled to the ball nut and configured to selectively supply the drive torque thereto.

4. The actuator of claim 3, further comprising:
   a gear set coupled between the motor and the ball nut.

* * * * *